(12) United States Patent
Rubel

(10) Patent No.: US 7,756,908 B2
(45) Date of Patent: Jul. 13, 2010

(54) DATABASE ANALYSIS TOOL

(75) Inventor: Ralf Rubel, Gaggenau (DE)

(73) Assignee: SAP AG, Walldorf (DE)

( * ) Notice: Subject to any disclaimer, the term of this patent is extended or adjusted under 35 U.S.C. 154(b) by 603 days.

(21) Appl. No.: 11/349,759

(22) Filed: Feb. 8, 2006

(65) Prior Publication Data

US 2007/0185830 A1    Aug. 9, 2007

(51) Int. Cl.
*G06F 17/30* (2006.01)
(52) U.S. Cl. .................................................... 707/805
(58) Field of Classification Search ................ 707/102, 707/103 X, 103 Y, 103 Z; 345/661, 667; 703/22; 713/2; 718/38
See application file for complete search history.

(56) References Cited

U.S. PATENT DOCUMENTS

2003/0167277 A1* 9/2003 Hejlsberg et al. ........... 707/102
2005/0262191 A1* 11/2005 Mamou et al. .............. 709/203

OTHER PUBLICATIONS

"The Data Browser" [online]. SAP Library, [retrieved on Dec. 14, 2005]. Retrieved from the Internet: URL: http://help.sap.com/saphelp_46c/helpdata/en/dl/8019cd454211d189710000c8322d00/content.htm.
"Other Data Browser Functions" [online]. SAP Library, [retrieved on Dec. 14, 2005]. Retrieved from the Internet: URL: http://help.sap.com/saphelp_nw04/helpdata/en/dl/8019e7454211d189710000e8322d00/content.htm.

* cited by examiner

*Primary Examiner*—Diane Mizrahi
(74) *Attorney, Agent, or Firm*—Fish & Richardson P.C.

(57) ABSTRACT

A method to be performed in a database analysis tool includes displaying selected contents of a database table in a database analysis tool being executed in a computer system. A user's selection of a portion of the selected contents is received. The portion contains information that identifies an object associated with an application program in the computer system. The method includes automatically causing the application program to perform a predefined action with regard to the object. A computer system includes a repository with at least one database table, an application program configured to perform a predefined action with regard to an object, and a database analysis tool configured to display selected contents of the database table. Upon a user selecting a portion of the selected contents containing information that identifies the object, the database analysis tool causes the application program to perform the predefined action with regard to the object.

20 Claims, 18 Drawing Sheets

| | ID | Nr | Departure Date | Price | Currency | Aircraft Type | Capacity | Occupied | Current Sum | Capacity | Occupied | Capacity | Occupied |
|---|---|---|---|---|---|---|---|---|---|---|---|---|---|
| 505 | AA | 17 | 11.08.2004 | 422,94 | USD | 747 – 400 | 385 | 339 | 193.347,29 | 31 | 31 | 21 | 19 |
| 505 | AA | 17 | 08.09.2004 | 422,94 | USD | 747 – 400 | 385 | 336 | 192.294,11 | 31 | 30 | 21 | 20 |
| 505 | AA | 17 | 06.10.2004 | 422,94 | USD | 747 – 400 | 385 | 334 | 191.769,67 | 31 | 29 | 21 | 21 |
| 505 | AA | 17 | 03.11.2004 | 422,94 | USD | 747 – 400 | 385 | 326 | 189.642,25 | 31 | 29 | 21 | 20 |
| 505 | AA | 17 | 01.12.2004 | 422,94 | USD | 747 – 400 | 385 | 337 | 195.445,04 | 31 | 31 | 21 | 21 |
| 505 | AA | 17 | 29.12.2004 | 422,94 | USD | 747 – 400 | 385 | 336 | 192.733,90 | 31 | 30 | 21 | 20 |
| 505 | AA | 17 | 26.01.2005 | 422,94 | USD | 747 – 400 | 385 | 329 | 190.818,10 | 31 | 30 | 21 | 21 |
| 505 | AA | 17 | 23.02.2005 | 422,94 | USD | 747 – 400 | 385 | 333 | 190.450,17 | 31 | 29 | 21 | 20 |
| 505 | AA | 17 | 23.03.2005 | 422,94 | USD | 747 – 400 | 385 | 336 | 193.410,65 | 31 | 31 | 21 | 20 |
| 505 | AA | 17 | 20.04.2005 | 422,94 | USD | 747 – 400 | 385 | 87 | 63.220,02 | 31 | 9 | 21 | 7 |
| 505 | AA | 17 | 18.05.2005 | 422,94 | USD | 747 – 400 | 385 | 176 | 109.879,89 | 31 | 18 | 21 | 11 |
| 505 | AA | 17 | 15.06.2005 | 422,94 | USD | 747 – 400 | 385 | 46 | 43.947,73 | 31 | 7 | 21 | 5 |

FIG. 2B

Structure of SFLIGHT – Flights

| Table | Field Name | Language | TabPos | Offset | Domain | Data Element | Table | Length | Int. Length | A length | Decimal Positions |
|---|---|---|---|---|---|---|---|---|---|---|---|
| SFLIGHT | MANDT | DE | 1 | | MANDT | S_MANDT | T000 | 3 | 6 | 3 | |
| SFLIGHT | CARRID | DE | 2 | 6 | S_CARR_ID | S_CARR_ID | SCARR | 3 | 6 | 3 | |
| SFLIGHT | CONNID | DE | 3 | 12 | S_CONN_ID | S_CONN_ID | SPFLI | 4 | 8 | 4 | |
| SFLIGHT | FLDATE | DE | 4 | 20 | S_DATE | S_DATE | | 8 | 16 | 10 | |
| SFLIGHT | PRICE | DE | 5 | 36 | S_PRICE | S_PRICE | SCURX | 15 | 8 | 20 | 2 |
| SFLIGHT | CURRENCY | DE | 6 | 44 | S_CURR | S_CURRCODE | SAPLANE | 5 | 10 | 5 | |
| SFLIGHT | PLANETYPE | DE | 7 | 54 | S_PLANE | S_PLANETYE | | 10 | 20 | 10 | |
| SFLIGHT | SEATSMAX | DE | 8 | 76 | S_SEATS | S_SEATSMAX | | 10 | 4 | 10 | |
| SFLIGHT | SEATSOCC | DE | 9 | 80 | S_SEATS | S_SEATSSOCC | | 10 | 4 | 10 | |
| SFLIGHT | PAYMENTSUM | DE | 10 | 84 | S_SUM | S_SUM | | 17 | 9 | 22 | 2 |
| SFLIGHT | SEATSMAX_B | DE | 11 | 96 | S_SEATS | S_SMAX_B | | 10 | 4 | 10 | |
| SFLIGHT | SEATSOCC_B | DE | 12 | 100 | S_SEATS | S_SOCC_B | | 10 | 4 | 10 | |
| SFLIGHT | SEATSMAX_F | DE | 13 | 104 | S_SEATS | S_SMAX_F | | 10 | 4 | 10 | |
| SFLIGHT | SEATSOCC_F | DE | 14 | 108 | S_SEATS | S_SOCC_F | | 10 | 4 | 10 | |

FIG. 2C

Structure of SFLIGHT – Flights

| Table | Field Name | Language | TabPos | Offset | Domain | Data Element | Table | Length |
|---|---|---|---|---|---|---|---|---|
| SFLIGHT | MANDT | DE | 1 | | MANDT | S_MANDT | T000 | 3 |
| SFLIGHT | CARRID | DE | 2 | 6 | S_CARR_ID | S_CARR_ID | SCARR | 3 |
| SFLIGHT | CONNID | DE | 3 | 12 | S_CONN_ID | S_CONN_ID | SPFLI | 4 |
| SFLIGHT | FLDATE | DE | 4 | 20 | S_DATE | S_DATE | | 8 |
| SFLIGHT | PRICE | DE | 5 | 36 | S_PRICE | S_PRICE | SCURX | 15 |
| SFLIGHT | CURRENCY | DE | 6 | 44 | S_CURR | S_CURRCODE | SAPLANE | 5 |
| SFLIGHT | PLANETYPE | DE | 7 | 54 | S_PLANE | S_PLANETYE | | 10 |
| SFLIGHT | SEATSMAX | DE | 8 | 76 | S_SEATS | S_SEATSMAX | | 10 |
| SFLIGHT | SEATSOCC | DE | 9 | 80 | S_SEATS | S_SEATSSOCC | | 10 |
| SFLIGHT | PAYMENTSUM | DE | 10 | 84 | S_SUM | S_SUM | | 17 |
| SFLIGHT | SEATSMAX_B | DE | 11 | 96 | S_SEATS | S_SMAX_B | | 10 |
| SFLIGHT | SEATSOCC_B | DE | 12 | 100 | S_SEATS | S_SOCC_B | | 10 |
| SFLIGHT | SEATSMAX_F | DE | 13 | 104 | S_SEATS | S_SMAX_F | | 10 |
| SFLIGHT | SEATSOCC_F | DE | 14 | 108 | S_SEATS | S_SOCC_F | | 10 |

12 sel. SFLIGHT - Flights

| MDT | ID | Nr | Departure Date | Price | Currency | Aircraft Type | Capacity | Occupancy | Current Sum |
|---|---|---|---|---|---|---|---|---|---|
| 505 | AA | 17 | 11.08.2004 | 422,94 | USD | 747 – 400 | 385 | 339 | 193.347,29 |
| 505 | AA | 17 | 08.09.2004 | 422,94 | USD | 747 – 400 | 385 | 336 | 192.294,11 |
| 505 | AA | 17 | 06.10.2004 | 422,94 | USD | 747 – 400 | 385 | 334 | 191.769,67 |
| 505 | AA | 17 | 03.11.2004 | 422,94 | USD | 747 – 400 | 385 | 326 | 189.642,25 |
| 505 | AA | 17 | 01.12.2004 | 422,94 | USD | 747 – 400 | 385 | 337 | 195.445,04 |
| 505 | AA | 17 | 29.12.2004 | 422,94 | USD | 747 – 400 | 385 | 336 | 192.733,90 |
| 505 | AA | 17 | 26.01.2005 | 422,94 | USD | 747 – 400 | 385 | 329 | 190.818,10 |
| 505 | AA | 17 | 23.02.2005 | 422,94 | USD | 747 – 400 | 385 | 333 | 190.450,17 |
| 505 | AA | 17 | 23.03.2005 | 422,94 | USD | 747 – 400 | 385 | 336 | 193.410,65 |
| 505 | AA | 17 | 20.04.2005 | 422,94 | USD | 747 – 400 | 385 | 87 | 63.220,02 |
| 505 | AA | 17 | 18.05.2005 | 422,94 | USD | 747 – 400 | 385 | 276 | 109.879,89 |
| 505 | AA | 17 | 15.06.2005 | 422,94 | USD | 747 – 400 | 385 | 46 | 43.947,73 |

DB - Analyzer

| HWA | ATS | ATV | ART | AAT | RT | ◀ | ▶ | | | SE11 | SE16 | SM31 |

18 DDIC Table in work area  — 224

| | Table | Filter | Association | Table Type | Short Description | Object Type |
|---|---|---|---|---|---|---|
| ○ | STRAVELAG | F | | TRANSP | Travel Agency | |
| | STICKET | F | ◯ | TRANSP | Flight Ticket | |
| | SPPLANE | F | | TRANSP | Passenger Aircraft | |
| | SPFLI | F | ◯ | TRANSP | Flight Schedule | |
| | SNVOICE | F | ◯ | TRANSP | Flight Invoice | |
| | SMENU | F | 502 | TRANSP | Menu | |
| | SGEOCITY | F | | TRANSP | Geographical Location of a City | |
| | SFLIGHT | F | | TRANSP | Flight | DRSFLIGHT |
| | SCUSTOM | F | | TRANSP | Flight Customer | |
| | SCURR | F | | TRANSP | Exchange Rate for Currency | |
| | SCPLANE | F | | TRANSP | Cargo Aircraft | |
| | SCITAIRP | F | | TRANSP | City-Airport-Relationship | |
| | SCARR | F | ◯ | TRANSP | Carrier Co. | |
| | SCARPLAN | F | | TRANSP | Carrier-Aircraft-Relationship | |
| | SBUSPART | F | | TRANSP | Flight Transaction Partner | |
| | SBOOK | F | ◯ | TRANSP | Individual Flight Bookings | |
| | SAPLANE | F | ◯ | TRANSP | Aircraft | |
| | SAIRPORT | F | | TRANSP | Airports | |

202
216

207

Table Associations

FIG. 5A

Structure of SCARPLAN – Carrier – Aircraft - Relationship

| Table | Field Name | Language | TabPos | Offset | Domain | Data Element | Table | Length |
|---|---|---|---|---|---|---|---|---|
| SCARPLAN | MANDT | DE | 1 | | MANDT | S_MANDT | T000 | |
| SCARPLAN | CARRID | DE | 2 | 6 | S_CARR_ID | S_CARR_ID | SCARR | |
| SCARPLAN | PLANETYPE | DE | 3 | 12 | S_PLANE | S_PLANETYE | SAPLANE | |
| SCARPLAN | SNUMBER | DE | 4 | 32 | S_NUMBER | S_NUMBER | | |

17 sel.SCARPLAN – Carrier – Aircraft - Relationship

| MDT | ID | Aircraft Type | Quantity |
|---|---|---|---|
| 505 | AA | 747 – 400 | 3 |
| 505 | AA | A310 – 300 | 5 |
| 505 | AZ | 747 – 400 | 7 |
| 505 | AZ | A319 | 5 |
| 505 | AZ | DC – 10 – 10 | 4 |
| 505 | DL | A310 – 300 | 4 |
| 505 | DL | A319 | 6 |
| 505 | DL | DC – 10 – 10 | 3 |
| 505 | JL | 747 – 400 | 4 |
| 505 | JL | DC – 10 – 10 | 1 |
| 505 | LH | 727 – 200 | 20 |
| 505 | LH | 737 – 200 | 3 |
| 505 | LH | 747 – 200F | 12 |
| 505 | LH | 747 – 400 | 3 |
| 505 | LH | 757F | 17 |
| 505 | LH | 767 – 200 | 2 |
| 505 | LH | 767 – 300 | 3 |

FIG. 6A

Table SFLIGHT: Selection Options 610 ⊠

Available Restrictions

| | | | |
|---|---|---|---|
| Carrier Co. | LH | to | |
| Aircraft Type | 727 – 200 | to | |
| Connection No. | | to | |
| Flight Date | | to | |
| Flight Price | | to | |
| Duration of Flight | | to | |
| Max. Capacity Eco. | | to | |
| Occupied Seats Economy Class | | to | |
| Current Booking Total | | to | |
| Max. Capacity Bus. | | to | |
| Occupied Seats Business Class | | to | |
| Max. Capacity First Class | | to | |
| Occupied Seats First Class | | to | |

612

☐ ☐ | Single Value | New Field Selection | ⊠

Structure of SFLIGHT - Flight

| Table | Field Name | Language | TabPos | Offset | Domain | Data Element | Table | Length | Int. Len |
|---|---|---|---|---|---|---|---|---|---|
| SFLIGHT | MANDT | DE | 1 | | MANDT | S_MANDT | T000 | 3 | 6 |
| SFLIGHT | CARRID | DE | 2 | 6 | S_CARR_ID | S_CARR_ID | SCARR | 3 | 6 |
| SFLIGHT | CONNID | DE | 3 | 12 | S_CONN_ID | S_CONN_ID | SPFLI | 4 | 8 |
| SFLIGHT | FLDATE | DE | 4 | 20 | S_DATE | S_DATE | | 8 | 16 |
| SFLIGHT | PRICE | DE | 5 | 36 | S_PRICE | S_PRICE | SCURX | 15 | 8 |
| SFLIGHT | CURRENCY | DE | 6 | 44 | S_CURR | S_CURRCODE | SAPLANE | 5 | 10 |
| SFLIGHT | PLANETYPE | DE | 7 | 54 | S_PLANE | S_PLANETYE | | 10 | 20 |
| SFLIGHT | SEATSMAX | DE | 8 | 76 | S_SEATS | S_SEATSMAX | | 10 | 4 |
| SFLIGHT | SEATSOCC | DE | 9 | 80 | S_SEATS | S_SEATSSOCC | | 10 | 4 |
| SFLIGHT | PAYMENTSUM | DE | 10 | 84 | S_SUM | S_SUM | | 17 | 9 |
| SFLIGHT | SEATSMAX_B | DE | 11 | 96 | S_SEATS | S_SMAX_B | | 10 | 4 |
| SFLIGHT | SEATSOCC_B | DE | 12 | 100 | S_SEATS | S_SOCC_B | | 10 | 4 |
| SFLIGHT | SEATSMAX_F | DE | 13 | 104 | S_SEATS | S_SMAX_F | | 10 | 4 |
| SFLIGHT | SEATSOCC_F | DE | 14 | 108 | S_SEATS | S_SOCC_F | | 10 | 4 |

12 sel. SFLIGHT - Flight

| MDT | ID | Nr | Flight Date | Price | Currency | Aircraft Type | Capacity | Occupied | Current Total | Capacity |
|---|---|---|---|---|---|---|---|---|---|---|
| 505 | AA | 17 | 11.08.2004 | 422,94 | USD | 747 – 400 | 385 | 339 | 193.347,29 | 31 |
| 505 | AA | 17 | 08.09.2004 | 422,94 | USD | 747 – 400 | 385 | 336 | 192.294,11 | 31 |
| 505 | AA | 17 | 06.10.2004 | 422,94 | USD | 747 – 400 | 385 | 334 | 191.769,67 | 31 |
| 505 | AA | 17 | 03.11.2004 | 422,94 | USD | 747 – 400 | 385 | 326 | 189.642,25 | 31 |
| 505 | AA | 17 | 01.12.2004 | 422,94 | USD | 747 – 400 | 385 | 337 | 195.445,04 | 31 |
| 505 | AA | 17 | 29.12.2004 | 422,94 | USD | 747 – 400 | 385 | 336 | 192.733,90 | 31 |
| 505 | AA | 17 | 26.01.2005 | 422,94 | USD | 747 – 400 | 385 | 329 | 190.818,10 | 31 |
| 505 | AA | 17 | 23.02.2005 | 422,94 | USD | 747 – 400 | 385 | 333 | 190.450,17 | 31 |
| 505 | AA | 17 | 23.03.2005 | 422,94 | USD | 747 – 400 | 385 | 336 | 193.410,65 | 31 |
| 505 | AA | 17 | 20.04.2005 | 422,94 | USD | 747 – 400 | 385 | 87 | 63.220,02 | 31 |
| 505 | AA | 17 | 18.05.2005 | 422,94 | USD | 747 – 400 | 385 | 276 | 109.879,89 | 31 |
| 505 | AA | 17 | 15.06.2005 | 422,94 | USD | 747 – 400 | 385 | 46 | 43.947,73 | 31 |

Structure of SFLIGHT - Aircraft

| Table | Field Name | Language | TabPos | Offset | Domain Name |
|---|---|---|---|---|---|
| SAPLANE | MANDT | DE | 1 |  | MANDT |
| SAPLANE | PLANETYPE | DE | 2 | 6 | S_PLANE |
| SAPLANE | SEATSMAX | DE | 3 | 28 | S_SEATS |
| SAPLANE | CONSUM | DE | 4 | 32 | S_CONSUM |
| SAPLANE | CON_UNIT | DE | 5 | 40 | S_UNIT |
| SAPLANE | TANKCAP | DE | 6 | 46 | S_CAPACITY |
| SAPLANE | CAP_UNIT | DE | 7 | 56 | S_UNIT |
| SAPLANE | WEIGHT | DE | 8 | 62 | S_FWEIGHT |
| SAPLANE | WEI_UNIT | DE | 9 | 70 | S_UNIT |
| SAPLANE | SPAN | DE | 10 | 80 | S_LENGTH |
| SAPLANE | SPAN_UNIT | DE | 11 | 88 | S_UNIT |
| SAPLANE | LENG | DE | 12 | 96 | S_LENGTH |
| SAPLANE | LENG_UNIT | DE | 13 | 104 | S_UNIT |
| SAPLANE | OP_SPEED | DE | 14 | 110 | S_SPEED |

1 sel.SAPLANE – Aircraft

| MDT | Aircraft Type | Capacity | Average Consumption |
|---|---|---|---|
| 505 | 747 – 400 | 385 | 9,950000000000000E+03 |

DB - Analyzer  802   808

| HWA | ATS | ATV | ART | AAT | RT | ◁ | ▷ | | | SE11 | SE16 | SM31 | Export | Import |

1 DDIC Table in work area

| | Table | Filter | Association | Table Type | Short Description |
|---|---|---|---|---|---|
| | SAPLANE | F | | TRANSP | Aircraft |
| | SBOOK | F | ( ) | TRANSP | Individual Flight Bookings |
| | SCARR | F | | TRANSP | Carrier Co. |
| | SCURX | F | | TRANSP | Exchange Rate |
| | SFLIGHT | F | | TRANSP | Flight |
| | SNVOICE | F | ( ) | TRANSP | Flight Invoice |
| | SPFLI | F | | TRANSP | Flight Schedule |
| | STICKET | F | | TRANSP | Flight Ticket |
| | T000 | F | | TRANSP | Customers |
| | SDYN_BOOK | F | | TRANSP | Dynprostructure-Flight Booking |

FIG. 8A

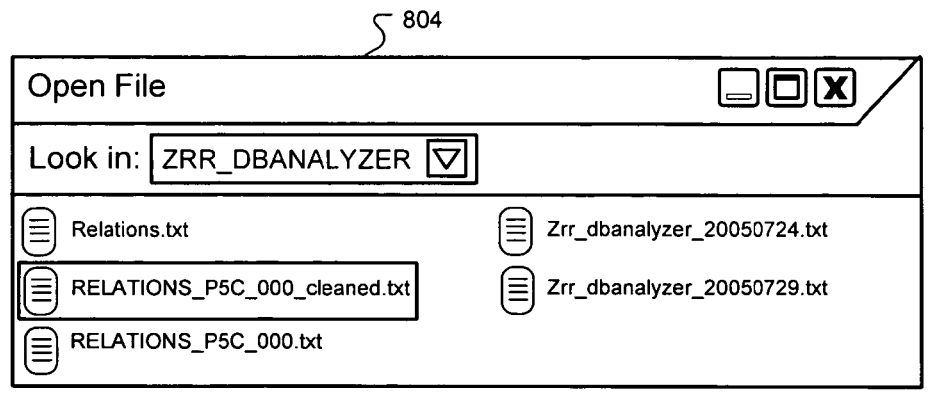

FIG. 8B

| RELATIONS_P5C_000_cleaned.TXT - EDITOR | | | |
|---|---|---|---|
| File  Edit  Format  View  Help | | | |
| T/1BEA/CRMB_BDH | /1BEA/CRMB_BDI | BDH_GUID | DBH_GUID |
| T/1BEA/CRMB_BDH | BEAC_BTY | BILL_TYPE | BILL_TYPE |
| T/1BEA/CRMB_BDH | BEAD_PPF | BDH_GUID | HEADGUID |
| T/1BEA/CRMB_BDH | BUT000 | PAYER | PARTNER |
| T/1BEA/CRMB_BDH | PRCD_HEAD | PRIDOC_GUID | KNUMV |
| T/1BEA/CRMB_BDH | USR02 | MAINT_USER | BNAME |
| T/1BEA/CRMB_BDI | /1BEA/CRMB_BDH | BDH_GUID | DBH_GUID |
| T/1BEA/CRMB_BDI | /1BEA/CRMB_DLI | BDH_GUID | DBH_GUID |
| T/1BEA/CRMB_BDI | BEAC_ITC | ITEM_CATEGORY | ITEM_CATEGORY |
| T/1BEA/CRMB_BDI | BEAD_MKT | MKTSET_GUID | MKTSET_GUID |
| T/1BEA/CRMB_BDI | COMM_PRODUCT | PRODUCT | PRODUCT_GUID |
| T/1BEA/CRMB_BDI | CRMD_ORDERADM_H | SRC_HEADNO | OBJECT_ID |

FIG. 8C

DATABASE ANALYSIS TOOL

TECHNICAL FIELD

The description relates to a database analysis tool that causes an application program to perform a predefined action with regard to an object.

BACKGROUND

Many computer systems use databases for storing and processing data. Information from such databases is typically available to users when they launch a particular application program that is configured to interact with the database, for example such that the program uses objects that include information gathered from one or more of the tables. The user can then extract information from, or input it into, the database using the functions provided by the program.

There are also other situations where a person needs access to the contents of the database. A database technician or another person with special knowledge about the system may wish to review and analyze the database and its contents to make sure it is working properly or analyze reasons for malfunction, or to gain insight into the database's structure for designing another database, to name a few examples.

There exists tools for performing such database analysis. They may, however, be associated with disadvantages. For example, the user may be required to make a complicated input each time the tool should access a new database table and display it for analysis. The amount of analysis that the user can perform may be limited due to the kind of information about the database table that the tool presents. Based on analyzing the database table, the user may wish to also investigate how an application program associated with the table at issue represents the current information. However, doing so may require the user to have expert knowledge in how to trigger the application program to perform the desired operation.

SUMMARY

The invention relates to a database analysis tool.

In a first general aspect, a method to be performed in a database analysis tool includes displaying selected contents of a database table in a database analysis tool being executed in a computer system. The method includes receiving a user's selection of a portion of the selected contents. The portion contains information that identifies an object associated with an application program in the computer system. The method includes automatically causing the application program to perform a predefined action with regard to the object.

Implementations may include any or all of the following features. The predefined action may include a display method, and the object may be displayed in a user interface of the application program upon the display method being performed. The database analysis tool may cease to be displayed upon the object being displayed in the user interface of the application program, and the method may further include again displaying the database analysis tool upon receiving a user input to cease displaying the object, the selected contents of the database table again being displayed in the database analysis tool. The selected contents of the database table may include a predefined number of rows of the database table specified by the user. The method may further include performing a reselect on the database table in response to receiving a user input made with a filter control in the database analysis tool, the reselect being automatically performed on all contents of the database table. There may be displayed in the database analysis tool 1) a database table content area containing the selected contents, and 2) a database table structure area describing at least one attribute of the selected contents. The selected contents may be displayed upon the user selecting the database table among several database tables in a work area in the database analysis tool. The method may further include 1) receiving a user input made under guidance of the work area while the selected contents are being displayed, the user input identifying another one of the several database tables that has a predefined association with the database table, and 2) displaying in the database analysis tool, in response to the user input, selected contents of the other database table that match the database table whose contents were first displayed in the database analysis tool. The predefined association may be automatically created using a foreign key relation between the database table and the other database table. The predefined association may be automatically created upon a user-initiated drag-and-drop operation that associates at least one row of the database table with the other database table. The predefined association may be automatically created upon receiving a user-specified edit of a mapping relating to the database table. When predefined associations exist between the database table and at least some others of the several database tables, the method may further include displaying the predefined associations in an associations area of the database analysis tool. The user may initiate a multi-level select between at least two of the several database tables under guidance of the associations area.

In a second general aspect, a computer system includes a repository having stored therein at least one database table, an application program configured to perform a predefined action with regard to an object, and a database analysis tool configured to display selected contents of the database table. Upon a user selecting, in the database analysis tool, a portion of the selected contents containing information that identifies the object, the database analysis tool causes the application program to perform the predefined action with regard to the object.

Implementations may include any or all of the following features. The system may further include at least one other database analysis tool, and the database analysis tool may provide that the user can initiate the other database analysis tool with the database table, and thereafter return to the database tool with the selected contents of the database table being displayed. The database analysis tool may be configured to generate 1) a database table content area containing the selected contents, and 2) a database table structure area describing at least one attribute of the selected contents. The database analysis tool may be configured to generate a work area for displaying any of several database tables stored in the repository. When predefined associations exist between the database table and at least some others of the several database tables, the database analysis tool may be configured to generate an associations area displaying the predefined associations. The database analysis tool may be configured to perform a multi-level select between at least two of the several database tables upon the user making an input under guidance of the associations area.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 2A-2C show a graphical user interface (GUI) for an embodiment of a data analysis tool.

FIGS. 4A-4B show an example of an application program being initiated from the database analysis tool.

FIGS. 5A-5B show an example of the graphical user interface that includes database tables that have several levels of associations.

FIGS. 6A-6C show an example of using the graphical user interface to build associations.

FIG. 7A-7C show an example of selecting a database table using an association button.

FIG. 8A-8C show an example of manually managing association and uploading from a computer.

Like reference numerals in the various drawings indicate like elements.

DETAILED DESCRIPTION

Figure 1:
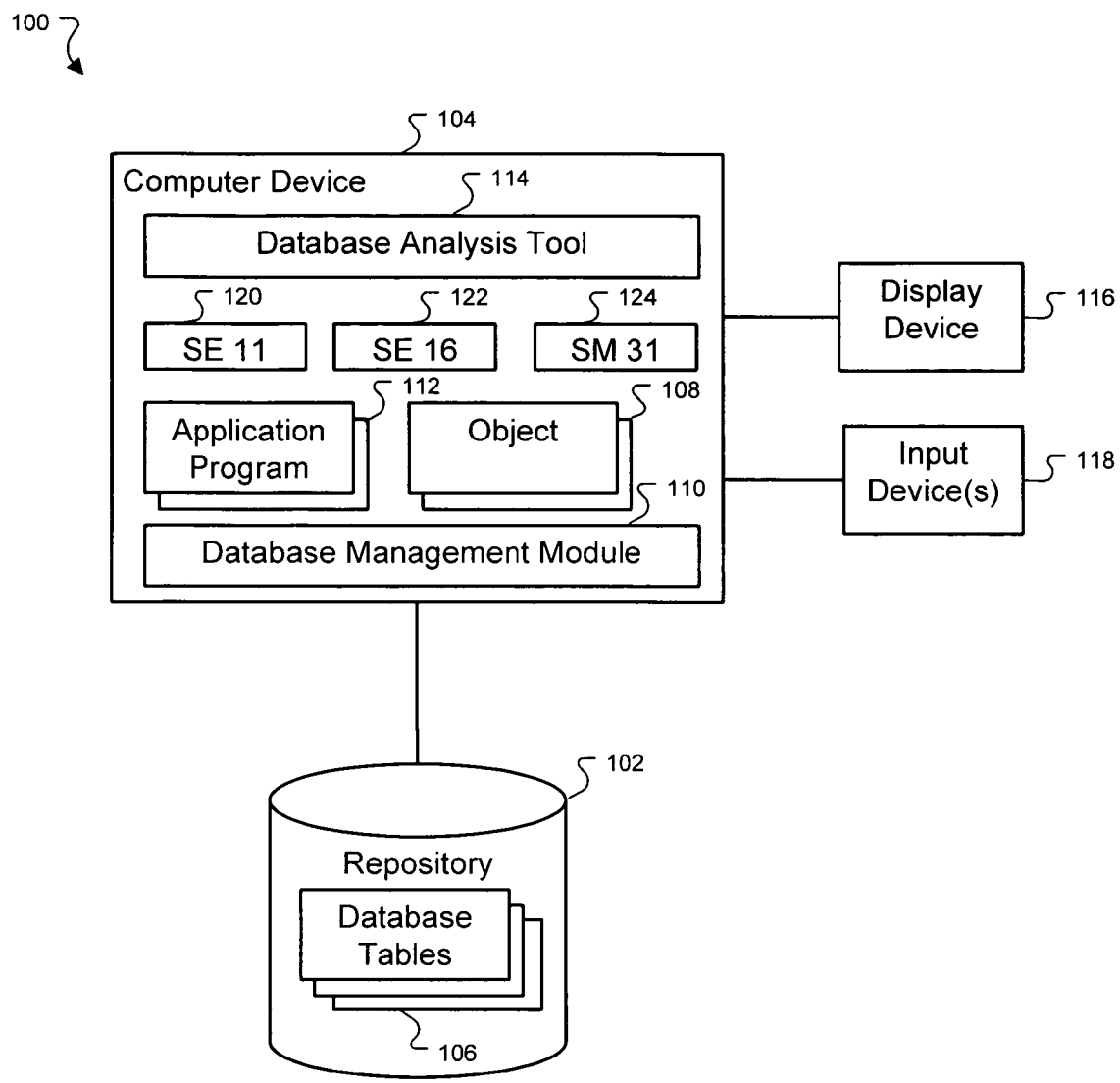
FIG. 1 shows an example of a system that can display a selected database table in a database analysis tool.

FIG. 1 shows an exemplary system 100 for displaying information regarding a database table. The displayed information may include multiple tables of information showing, for example, a structure of the database table, selected content of the database tables, and associations between one database table and other database tables. Particularly, the exemplary system 100 includes an analysis tool to receive user's selection of a portion of the displayed content and perform predefined actions with regard to selected information. Additionally, the system 100 may also identify and initiate an application program associated with the user-selected information.

The system 100 includes a repository 102 and a computer device 104. The repository 102 includes one or more database tables 106. The database tables 106 include information that may be used by objects 108 in the computer device 104. For example, the database tables 106 may contain information on aircraft, airline carriers, price of air tickets, etc. that corresponds to instances of the objects 108. In particular, one of the objects 108 may be an air ticket invoice that includes an originating airport, a destination airport, and a price. The computer device 104 includes a database management module 110 that is configured to read and write the database tables 106 in the repository 102. The database management module 110 can be an interface module in an operating system or a software module that communicates with the repository 102. One or more application programs 112 is included in the computer device to use information read from the database tables 106 and perform one or more actions with regard to the objects 108.

The computer device 104 includes a database analysis tool 114 to allow users (e.g., developers, testers, support engineers, consultants, system administrators, etc.) to analyze one or more of the database tables 106. The database analysis tool 114 may generate a graphical user interface (GUI) to be presented on a display device 116 and may receive users input from one or more input devices 118. For example, a developer who is working on a flight booking application program can select, using the database analysis tool 114, a portion of the database tables 106 to be displayed, for example all database tables that include the field "Flight Number."

Using the content in the database table content area, a user may identify objects and perform a predefined action with regard to the objects. Particularly, a user can select information in the displayed database table that identifies one of the objects 108. Upon receiving this selection, the data analysis tool 114 invokes the application program 112 that uses the selected object. The application program 112, in turn, performs a predefined action with regard to the object. This action may be a display method, for example.

Some of the application programs 112 may perform actions with regard to objects that are associated with multiple inter-related database tables 106. A user of the application programs 112 may use the database analysis tool 114 to inspect relationships of the database tables 106. For example, the flight booking application program 112 may use information in one of the database tables 106 that relates to aircraft, in another database table that relates to flight schedule, and in yet another database table that relates to ticket price. In some embodiments, the database analysis tool 114 may display one or more associations between the database tables 106 in a hierarchical tree and provide control to allow the user to perform multi-level selects between the database tables.

There may be preconditions that the system must meet before the database analysis tool is implemented. For example, there has to be a data dictionary and an object repository. As another example, there has to be access to the database and to the applications built on top of the database.

In the depicted example, the computer device 104 may also include other database analysis tools. For example, a first database tool 120 may be the data dictionary tool known as transaction SE11 that is available in products from SAP AG in Walldorf (Baden) Germany. For another example, a second database tool 122 may be the data browser tool known as transaction SE16 that is available in products from SAP AG. For example, a third database tool 124 may be the table view maintenance tool known as transaction SM31 that is available in products from SAP AG. These tools 120, 122, 124 may provide analysis functions on the database tables 106 that may or may not be provided in the database tool 114. In some embodiments, the database analysis tool 114 may provide control that the user can initiate any of the other tools 120, 122, 124 to analyze a specific one of the database tables 106 and later return to the database analysis tool 114 in the same context as before.

Figure 2A:
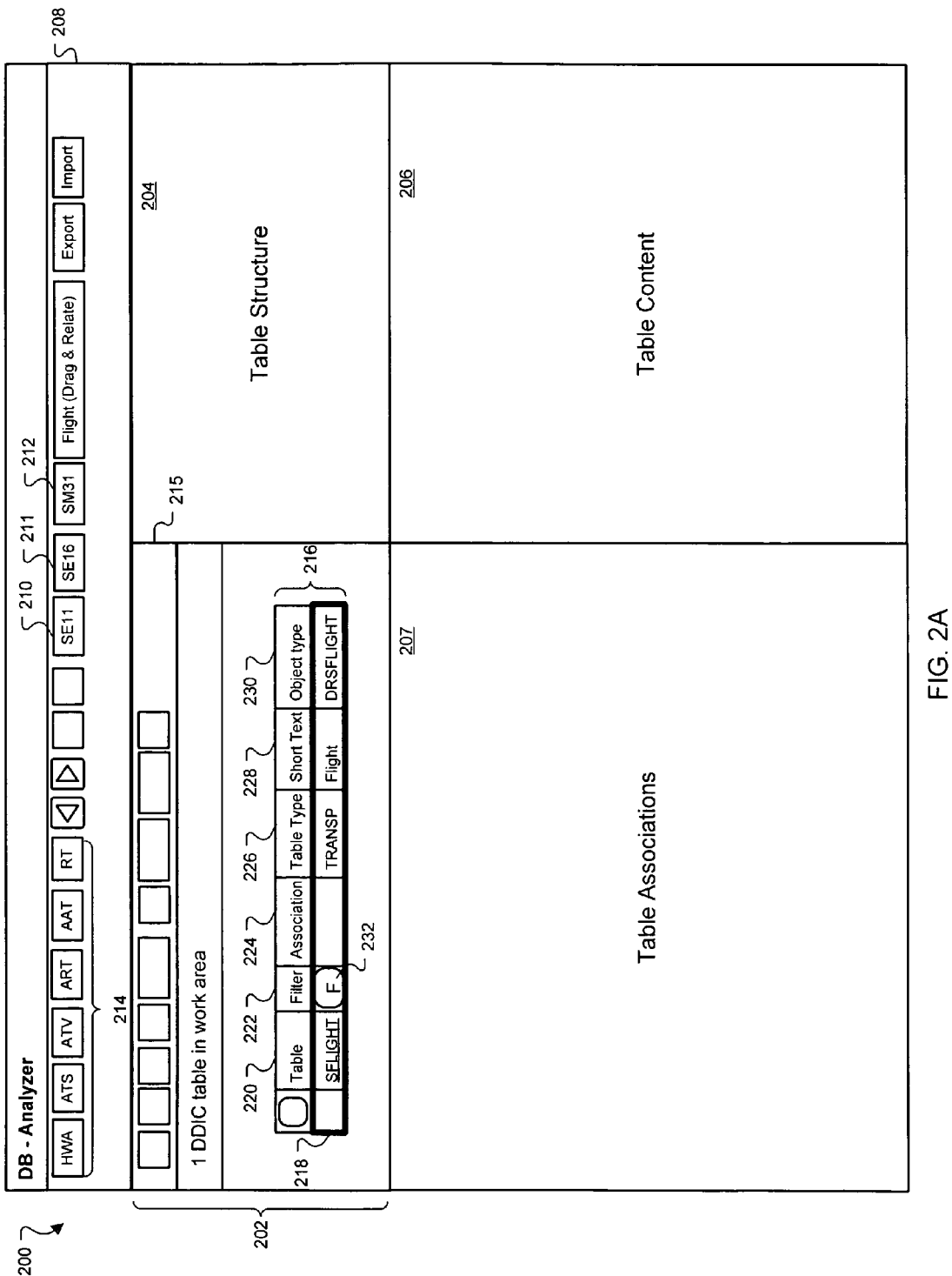

FIG. 2A shows an exemplary graphical user interface (GUI) 200 that the database analysis tool 114 can generate. Using the GUI 200, a user can analyze content and structure of any of the database tables 106, inspect data from multiple database tables 106, navigate to the other tools 120, 122, 124, navigate to the associated objects 108, manage a work area, and manage associations between the database tables 106 to name some examples. The GUI 200 includes a table work area 202, a table structure area 204, a table content area 206, and a table associations area 207. The GUI 200 also includes a tool bar 208 that includes a number of buttons to allow users to manage any or all of the work areas 202, 204, 206, and 207. For example, the tool bar 208 includes buttons 210, 211, 212 that, when selected, initiate one of the other tools 120, 122, or 124 using a table or information selected in the GUI 200. The tool bar 208 also includes work area management buttons 214 to manage tables in the work area. The HWA button is configured to hide the table work area 202. The ATS button is configured to add tables to the table work area 202 via search help. The ATV button is configured to add tables to the table work area 202 from a variant, which is a predefined collection of database tables that are related, for example because they are used by the same application program. The ART button is configured to add referenced tables and structures. The AAT button is configured to add associated tables to the table work area 202. The RT button is configured to removes tables from the table work area 202.

The table work area 202 includes a tool bar 215 that provides functions relevant to the table work area 202. A user can select one or more database tables to be displayed in the table work area 202, for example by specifying the database table names or reference numbers, or by loading a previously stored search criteria, or by using a search function that allows the user to specify a few search criteria, or other searching or filtering methods. For example, a user may enter a range "0101-0154" of database table reference numbers to select a range of database tables to be displayed. In another example, the user may select a "variant". The table work area 202 currently displays a work area table 216 that can include entries for one or more selected database tables. In the depicted example, there is a single table entry 218 in the work area table 216. However, there can be multiple table entries displayed in the table 216, depending on user selection and the information in the database tables 106. The table 216 includes a table column 220, a filter column 222, an association column 224, a table type column 226, a short text column 228, and an object type column 230 for presenting information regarding the selected table(s).

The table column 220 presents a name of each database table represented in each table entry 218. The filter column 222 includes a filter button 232 that a user may use to refine selection of the database tables 106. The association column 224 may include information on an association, if the association exists, between two or more database tables represented by entries in the work area table 216. The table type column 226 and the object type column 230 present the table type and the object type associated with each entry in the table 216. The short text column 228 provides a short description of the content in each of the available database table in the table 216. In the depicted example, a user may learn, from the short text column 228, that the database table SFLIGHT contains flight information. Upon selection on the table entry 218, structures and contents of the database table that corresponds to the table entry 218 are displayed in the table structure area 204 and the table content area 206, respectively.

FIG. 2B shows the table content area 206 when the table entry 218 is selected. The table content area 206 includes a tool bar 232 and a title 234. The tool bar 232 provides functions relevant to the table content area 206. The title 234, which is shown as ">200 sel. SFLIGHT—Flights," means that the table content area 206 is displaying two hundred entries of content from the database table SFLIGHT. This corresponds to a selection made in the SFLIGHT database table. In some implementations, a user can select, using the input device 118, the number of table entries to be displayed. As an example, the developer of a flight booking application program may use the database analysis tool 114 to display only fifteen entries in the SFLIGHT database table. Selecting to display only a limited number of rows of an extensive table may provide the user a representative view of the database table. Based on that limited view, the user may decide to perform a more complex reselect to obtain the information that the user needs.

The table content area 206 includes a database display area 236 that displays the selected content. In the depicted example, each entry in the database table SFLIGHT includes fourteen attributes: a MDT 238, a carrier ID 239, a connection number 240, a departure date 241, a price 242, a currency 243, an aircraft type 244, a capacity of economic class 245, an occupied seats in economic class 246, a current sum 247, a capacity of business class 248, an occupied seats in business class 249, a capacity of first class 250, and an occupied seats in first class 251. For example, the flight book application program may use a flight object that uses some or all of the data associated with the attributes shown in the database display area 236. A developer of the flight booking application program may inspect the database table SFLIGHT to assist application program development. Some or all of the attributes 238-251 can also be associated with data in another table. For example, the carrier ID 239 may be associated with another database table that includes carrier company information.

FIG. 2C shows the table structure area 204 which presents the structure of the information in the database table. The table structure area 208 includes a tool bar 252 and a title 254. The tool bar 252 provides functions relevant to the table content area 204. The title 254, which is shown as "Structure of SFLIGHT—Flights," means that the table content area 204 is displaying the data structure of the database table SFLIGHT.

The table structure area 204 includes a structure display area 256 that describes at least one attribute of the information of the selected content. In the depicted example, the structure display area 256 includes a portion of all information that describes the attributes in the SFLIGHT database table. As shown, the structure display area 256 includes twelve columns of information: a table column 258, a field name column 259, a language column 260, a table position column 261, an offset column 262, a domain column 263, a data element column 264, a table association column 265, a length column 266, a Int. length column 267, an A length column 268, and a decimal positions column 269. Each of the columns 258-269 may contain structural information about each of the fields that are included in the SFLIGHT table. A user, such as a tester or a developer of application programs, can understand the attributes included in the SFLIGHT database table by inspecting the displayed structure 258-269. For example, the user can determine from the area 204 that the FLDATE field uses the data element S_DATE or that the PAYMENTSUM field belongs to the domain S_SUM. As another example, the user may find out, from the decimal positions column 269, that the price attribute 242 in the SFLIGHT database table is accurate up to two decimal positions. Such structural information can be useful to a database expert who is analyzing the table.

In some embodiments, the GUI 200 may also provide functionality to perform a reselect on a database table in the repository. The user can initiate this by selecting the filter button 232. The database analysis tool 114 may then generate, based on currently displayed attributes, a table reselection area for performing a reselection the entire database table. That is, not only on the table rows that are currently displayed in the content area.

Figure 3:
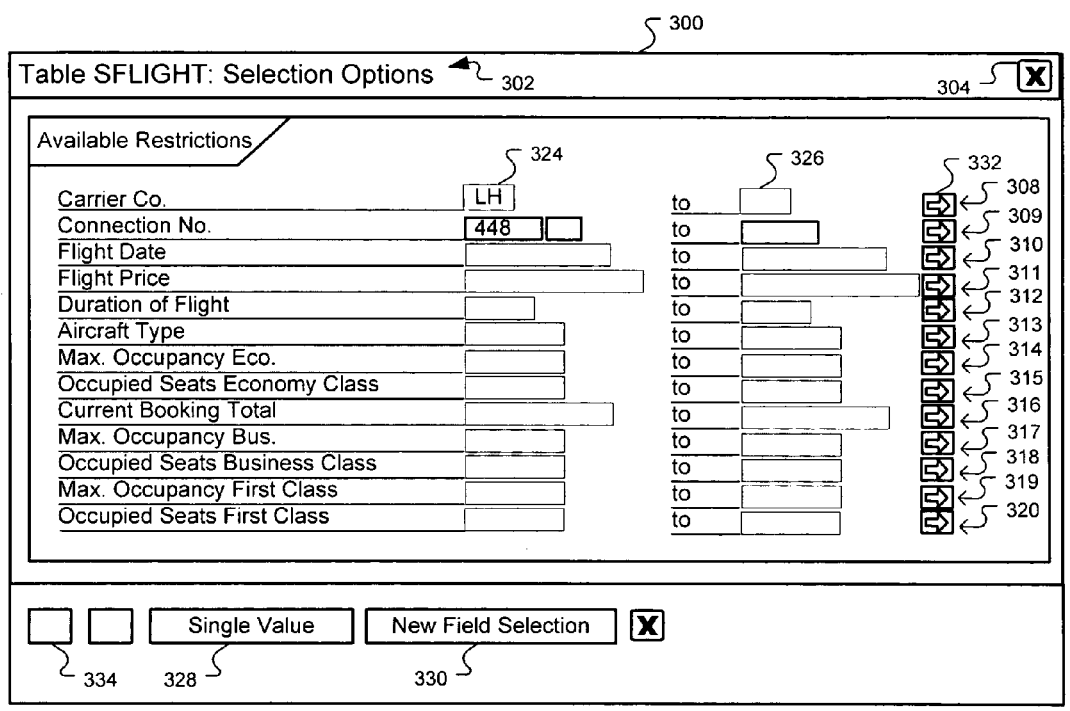
FIG. 3 shows an example of a table reselection area being presented on the GUI shown in FIG. 2A.

FIG. 3 shows an exemplary table reselection area 300 that may be presented in the GUI 200 when the user selects the filter button 232. The user can use the table reselection area 300 to perform a reselect on the database tables. For example, a user may first perform a relatively simple search on the database tables 106 and obtain a first result such as the depicted example in FIG. 2. Based on knowledge gained from the first result—for example, by knowing what attributes are available—the user may perform a reselection of database tables using the filter button 232. The database analysis tool 114 can perform the reselection automatically on all contents in the repository 102. The table reselection area 300 includes a title 302, a close button 304, and a restriction input area 306. The title 302 presents description of the table reselection area 300. In the depicted example, the title 302 reads "Table SFLIGHT: Selection Options", meaning that the table reselection area 300 is displaying selection options obtained from the content in the database table SFLIGHT. The close button 304 allows the user to abort the current reselection operation and return to the GUI 200.

The restriction input area 306 includes thirteen restriction fields: a carrier company field 308, a connection number field 309, a flight date field 310, a flight price field 311, a duration of flight field 312, an aircraft field 313, a maximum occupancy in economy class field 314, an occupied seats in economy class field 315, a current booking total field 316, a maximum occupancy in business class field 317, a occupied seats business class field 318, a maximum occupancy in first class field 319, a occupied seats first class field 320. In some implementations, the database analysis tool 114 dynamically includes the displayed fields 308-320 from the currently selected database table. In this example, the available fields 308-320 may be, at least partially, based on the attributes 239-251 of the SFLIGHT database table as shown in the table content area 206.

A user can define selection criterions by inputting a requirement for at least one of the fields 308-320. As shown, each restriction field 308-320 includes a "from" input box 324 and a "to" input box 326 to allow the user to input a range of values. Additionally, the table reselection area 300 includes a single value button 328 that allows the user to, instead of specifying a range of values, reselect database table using a single value. For example, the user may choose to reselect database table based on the input as shown in FIG. 3. The input contains a single value "LH" in the carrier company field 308 and a single value "448" in the connection number field 309. The user may specify to perform the reselect on the database table by a single value in these two criterions by selecting the single value button 328. Then the database analysis tool 114 may display some or all database table content in which the carrier ID 239 equals "LH" and the connection number 240 equals "448." The table reselection area 300 also includes a new field selection button 330. A user can use the new field selection button 330 to clear all the input values currently displayed in the restriction fields 308-320. The table reselection area 300 includes buttons 332 that leads to another display that allows multiple values to be entered for each of the restriction fields 308-320. When the user has input all filter criterions in the restriction fields 308-320, the user may use a button 334 to confirm filter criterions and initiate a reselection operation.

In some embodiments, the table content area 206 may sometimes contain attributes for all information that is necessary to identify the object 108 that is associated with an entry in the selected database table 106. Upon reviewing this information, the user may wish to see what the object actually looks like, or evaluate some other aspect thereof. The database analysis tool 114 is configured to cause the object 108 associated with selected table content to be displayed. This may be done using the application program 112. One implementation of this operation is described below.

FIG. 4A shows an exemplary display 400 of the table structure area 204 and the table content area 206 that can be presented by the database analysis tool 114. The database analysis tool 114 can cause the object 108 to be displayed, using functionality provided in the tool bar 208.

As shown, the table content area 206 in the display 400 is presenting selected contents 402 of the SFLIGHT database table. For example, the user may select the content 402 by using the filter button 232 and the reselection area 300. The database analysis tool 114 can receive user input to select a portion of the content 402. In this example, the user has selected an entry 404. The contents of the entry 404 includes the attributes that allow the database analysis tool 114 to identify the relationship between the selected entry 404 and one of the objects 108 in the computer device 104. When an association between the selected entry 104 and at least one of the objects 108 is identified, a drag and relate button 406 in the toolbar 208 may be activated for user selection. Upon a user selecting the button 406, the object will be displayed, for example.

Any of several predefined actions may be performed upon the user navigating from the database analysis tool 114 to the application program. For example, a display method of the object may be performed, which allows the user to see a representation of the object.

Figure 4B:

FIG. 4B shows an exemplary GUI 420 that is generated by the computer device 104 when the user selects to display the object 108 corresponds to the table entry 404. The GUI 420 is generated by the application program and shows data of flights based on a specified carrier company, flight number, and departure date. The GUI 420 includes a description area 422 that describes user requirement of flights data to be displayed. The user may input information in the description area 422 to specify the carrier company, the flight number, and the departure date. In the depicted example, the description area 422 is automatically completed by the display method of the identified object 108. The GUI 420 also includes an available flight area 424 and a flight information area 426. In this example, the presented information includes a departure airport, an arrival airport, a flight date, a flight price, an aircraft type, a maximum occupancy, and an occupied current total. Depending on the executed method, the user may be able to maintain data in the GUI 420, for example by adding information. On the contrary, a "display mode" type of method performed on the object may allow only visual inspection of the object representation. After the user is done with the identified object 108, the user may close the GUI 420. Then, the GUI 200, with previously selected content, may be displayed again.

Figure 5B:
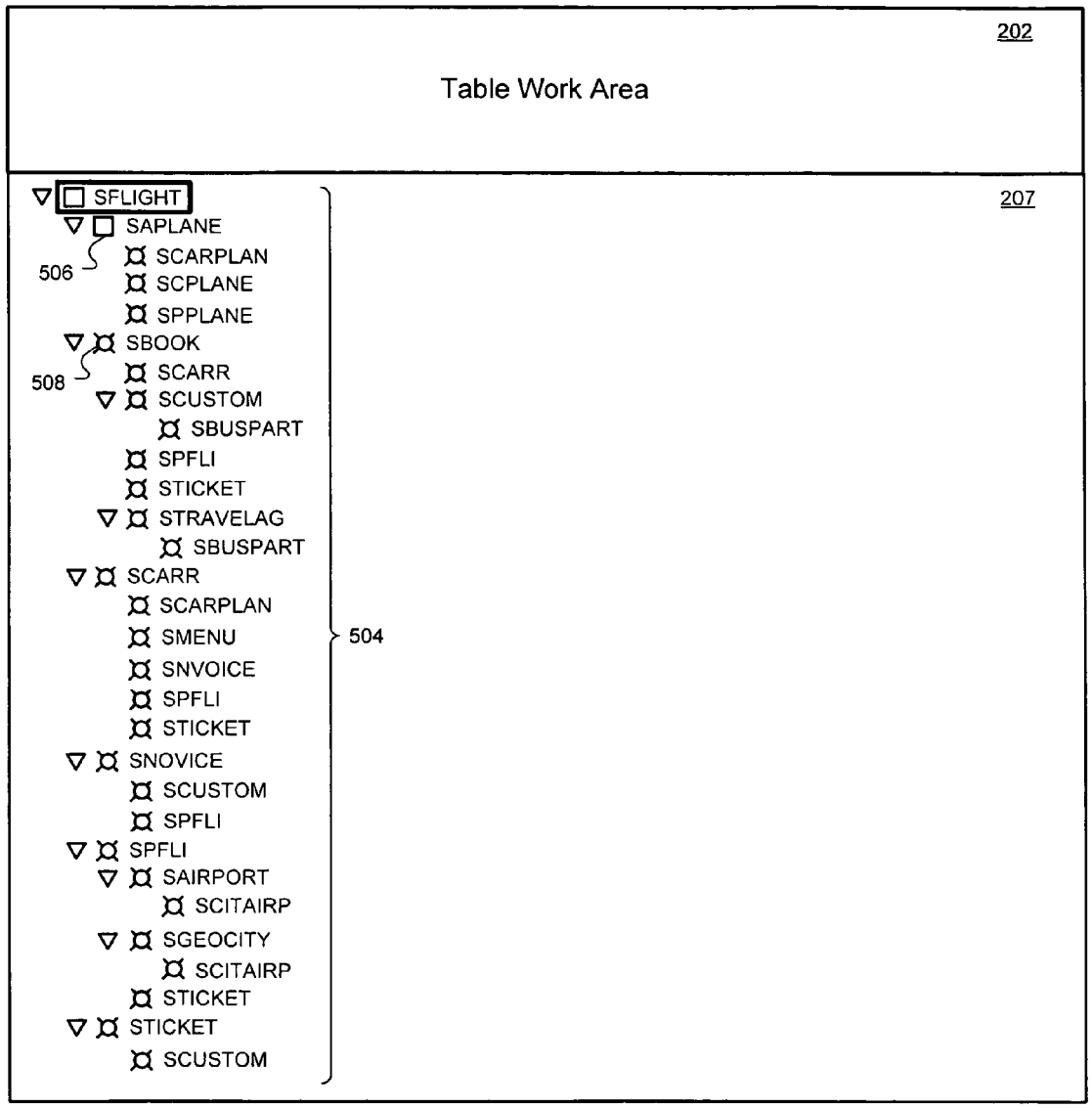

FIGS. 5A and 5B show an exemplary display 500 that includes the table work area 202 and the table associations area 207. Referring to FIG. 5A, the work area table 216 contains eighteen table entries, each corresponding to a database table. In some of the table entries, an association button 502 is displayed in the association column 224. The association button 502 is displayed when there is an existing association between the database table 106 represented by the table entry and the currently displayed database table.

An association is the relationship between two database tables due to at least one common attribute. Once an association is built, it can be used to explore the data model and to provide easier selections between multiple tables. The database analysis tool 114 provides three ways that table associations can be built. They can be built automatically via a foreign key relation, automatically after a drag and drop operation, and manually via upload from a computer. The data analysis tool 114 is configured to use the table associations to build multilevel selections among the database tables 106. The GUI 200 is configured to display predefined associations between the selected database table and other database table in the table associations area 207.

Referring to FIG. 5B, an exemplary association hierarchy 504 in the display 500 is shown. The association hierarchy 504 includes names of database tables listed in the work area table 216 that are associated with each other. The association hierarchy also includes icons located next to each name of the database tables to represent a state of the select(s) performed on the database tables. As an example, an icon 506 represents that a select operation for this table was performed and at least one table entry was found in the selection operation. As another example, an icon 508 represents that a selection for this table has not yet been performed. A third icon (not shown) may be used in association with a table entry when a select operation has been performed for that table, and no database entries were found A root of the hierarchy 504 is the currently selected database table SFLIGHT. In this example, the hierarchy 504 displays several levels of associations. For example, the SFLIGHT database table is associated with a SAPLANE database table, and the SAPLANE database table is associated with a SCARPLAN database table. As another example, the SFLIGHT database table is associated with a SPFLI database table. The SPFLI database table is associated with an SAIRPORT database table, and the SAIRPORT database table is associated with a SCITAIRP database table. The user can directly navigate from the database table at the root to another database table that is associated with the root database table, for example to the SCARPLAN database table or the SCITAIRP database table. This automatic selection over multiple levels of database table associations is more convenient for the user than an alternative approach where first the user must open the database table SFLIGHT to learn the name of a specific attribute, then open one or more intermediate database tables that correlate that attribute with another attribute, and finally open the SCARPLAN database table or the SCITAIRP database table to complete the analysis.

The associations can be created in any of several ways. The database analysis tool 114 can automatically create associations between database tables using the foreign key relation between the database table and another database table. As another example, the user can create an association using a drag and drop operation, or upload the association from a computer. An example of the drag and drop operation will now be described.

Figure 6B:
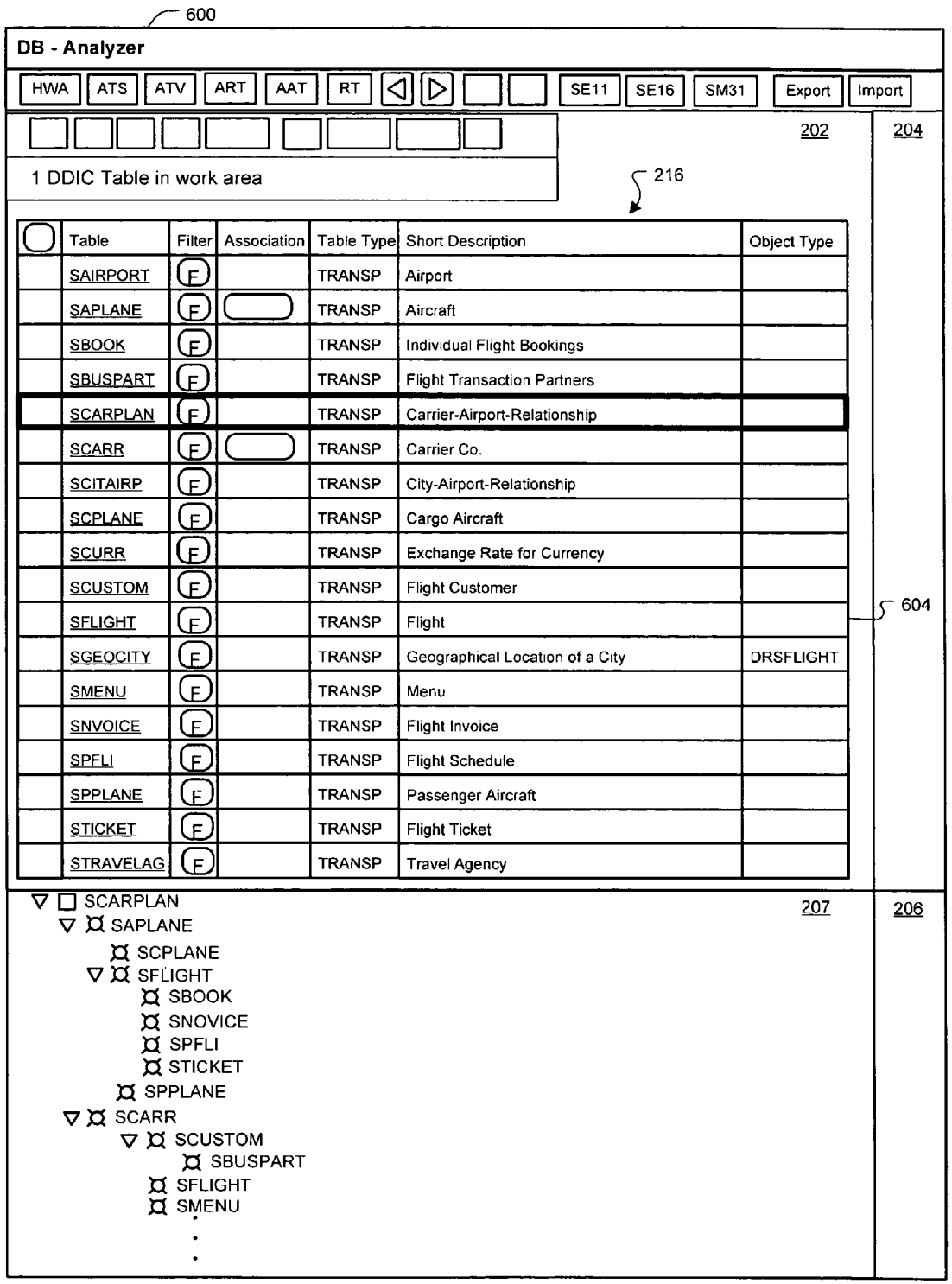

FIGS. 6A-6C show an exemplary display 600 in which the SCARPLAN database table is selected. The database analysis tool 114 is configured to build an association when the user initiates a drag and drop operation. Referring to FIG. 6A, the display 600 includes structure information for SCARPLAN in the table structure area 204 and SCARPLAN content in the table content area 206. The portion of the display 600 that includes the work area table 216 is shown in FIG. 6B for clarity. The table 216 contains a table entry 604 corresponding to the table SFLIGHT. The user can initiate the drag and drop operation by dragging one entry, such as a table entry 602 in FIG. 6A, in the table selection table 256 and dropping it on the table entry 604 in FIG. 6B. The user does this to create an association between SCARPLAN and SFLIGHT. Upon receiving the input from the drag and drop operation the system 100 accesses the database tables 106. Particularly, the system 100 may establish an association between the database tables involved in the drag and drop operation.

Referring to FIG. 6C, the previously described drag and drop operation triggers the database analysis tool 114 to generate a selection area 610. In the depicted example, the selection area 610 is configured to present an input interface for the user to create selection criterions. The database analysis tool 114 can use the selection criterions to find database table entries in the SFLIGHT database table in relation to the SCARPLAN database table. The selection area 610 includes selection fields 612. In some embodiments, the database analysis tool 114 may identify the selection fields 612 that are common to both database tables and automatically fill the identified selection fields 612 with content from the table entry 602 (FIG. 6A). If the selection results at least one database table entry, the association between the involved tables is built.

Figure 7A:
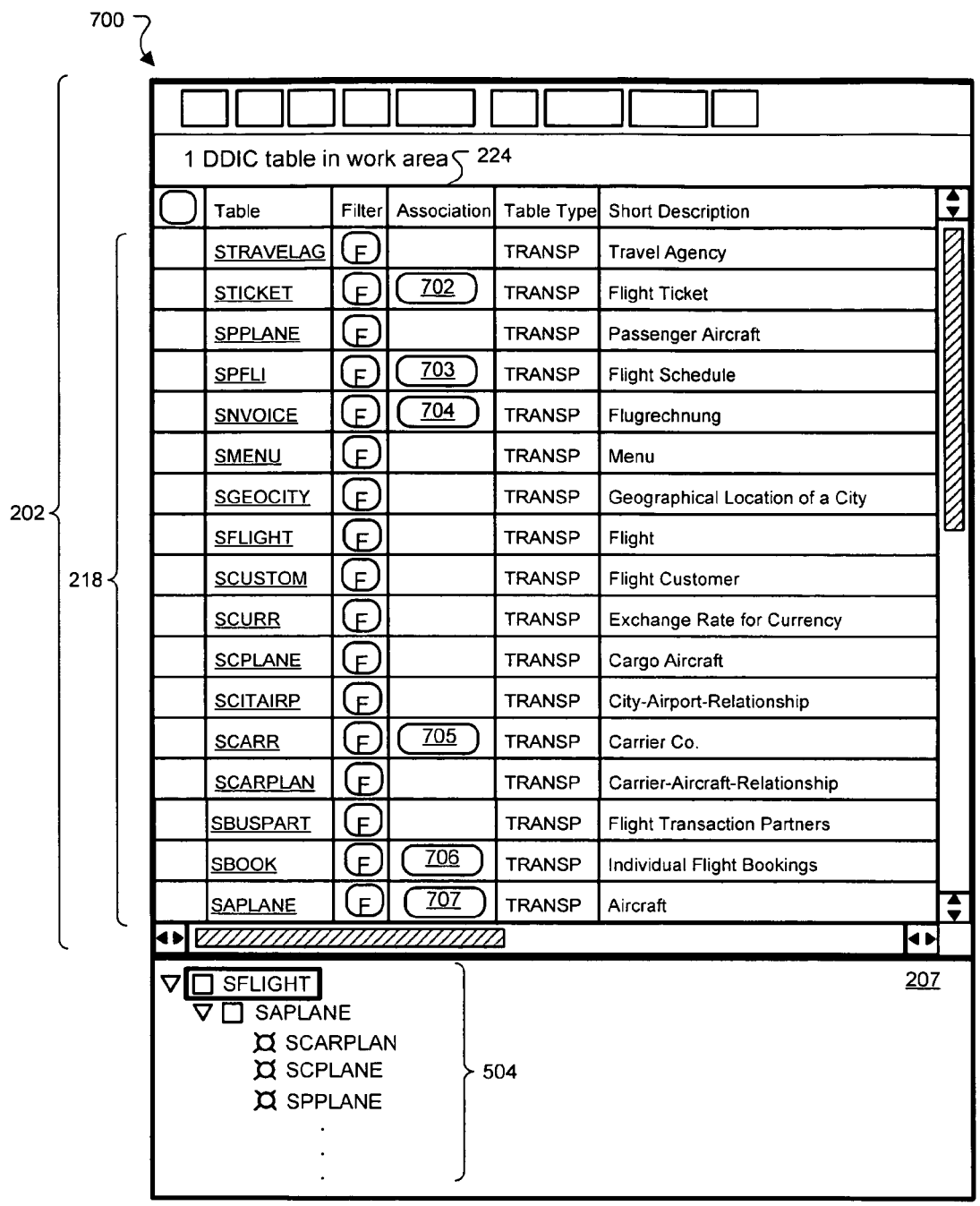

FIG. 7A-7B show an exemplary display 700 that includes the user making an input in the work area 202 to select a predefined association in the database table. Referring to FIG. 7A, the association column 224 includes association buttons 702-707 in some of the table entries 218. The database analysis tool 114 is configured to display the association buttons 702-707 in those of the table entries 218 that are directly associated with the currently selected database table. For example, the currently selected database table is SFLIGHT. In this example, the SFLIGHT database table is directly related to, or has a single level relationship with, a STICKET database table, a SPFLI database table, a SNOVICE database table, a SCARR database table, a SBOOK database table, and a SAPLANE database table. All the table entries 218 representing the above database tables therefore include the association buttons 702-707.

The database analysis tool 114 is configured to select a database table using the association buttons 702-707 or the hierarchy 504. The user can select one of the association buttons 702-707 to initiate a reselect of the database table using predefined associations. In the depicted example, the currently selected database table is the SFLIGHT database table. The user may, for example, select the association button 707 to select the SAPLANE database table based on predefined associations. In response, the hierarchy 504 presents the association between SFLIGHT and SAPLANE, and also associations between SAPLANE and other tables.

Selection criterions for table content filtering are automatically set based on the user's selection in the currently displayed table content. For example, referring to FIG. 7B, the user may select a table entry 709 and select the association button 707. After that, the database analysis tool 114 selects the SAPLANE database for display and automatically filters the information in the SAPLANE database based on the selected table entry 709. In this example, the displayed table content must include a value for MDT that equals 505, an aircraft type that equals 747-400, a capacity that equals to 385, and other attributes that equal to the attribute in the selected table entry 704. An exemplary resulting display portion 710 is shown in FIG. 7C. The display portion 710 shows that the SAPLANE database table is selected and selected displayed table content in the database display area 236 matches the content of the previously selected table entry 709. When the SAPLANE database table is selected, the database analysis tool 114 also updates hierarchy 504 to reflect new hierarchy based on current selection of database tables. For example, the root of a new hierarchy (not shown) is SAPLANE instead of SFLIGHT.

The GUI 200 also includes functionality for the user to manually manage database table associations. Referring to FIG. 8A, the GUI 200 includes an export button 802. When the export button 802 is selected, a file selection area 804 shown in FIG. 8B is displayed. Here, files in a folder called ZAR_DBANALYZER are being presented. From the file selection area 804, the user may select a file that includes mapping data. The mapping data contains associations between two database tables 106, associations between the database tables 106 and the objects 108, and other association mappings. For example, the object 108 includes information about which application is to be launched and the mapping data includes information about the relation between database tables and objects. Then, when the DB analysis tool 114 is triggered to display a database table, the DB analysis tool 114 may find a related object from the mapping data and the object may link to an application to be launched. FIG. 8C shows an exemplary mapping editor 806 that is generated when a file "RELATIONS_P5C__000_cleaned.txt" is selected in the file selection area 804. The database analysis tool 114 displays the mapping editor 806 when the user selects one of the files from the file selection area. In this example, data in the file "RELATIONS_P5C__000_cleaned.txt" is displayed in the mapping editor 806. In the mapping editor 806, the user can manually manage different mappings. When the user is done with editing, the GUI 200 includes an import button 808 to upload new associations into the database analysis tool 114.

Figure 9:
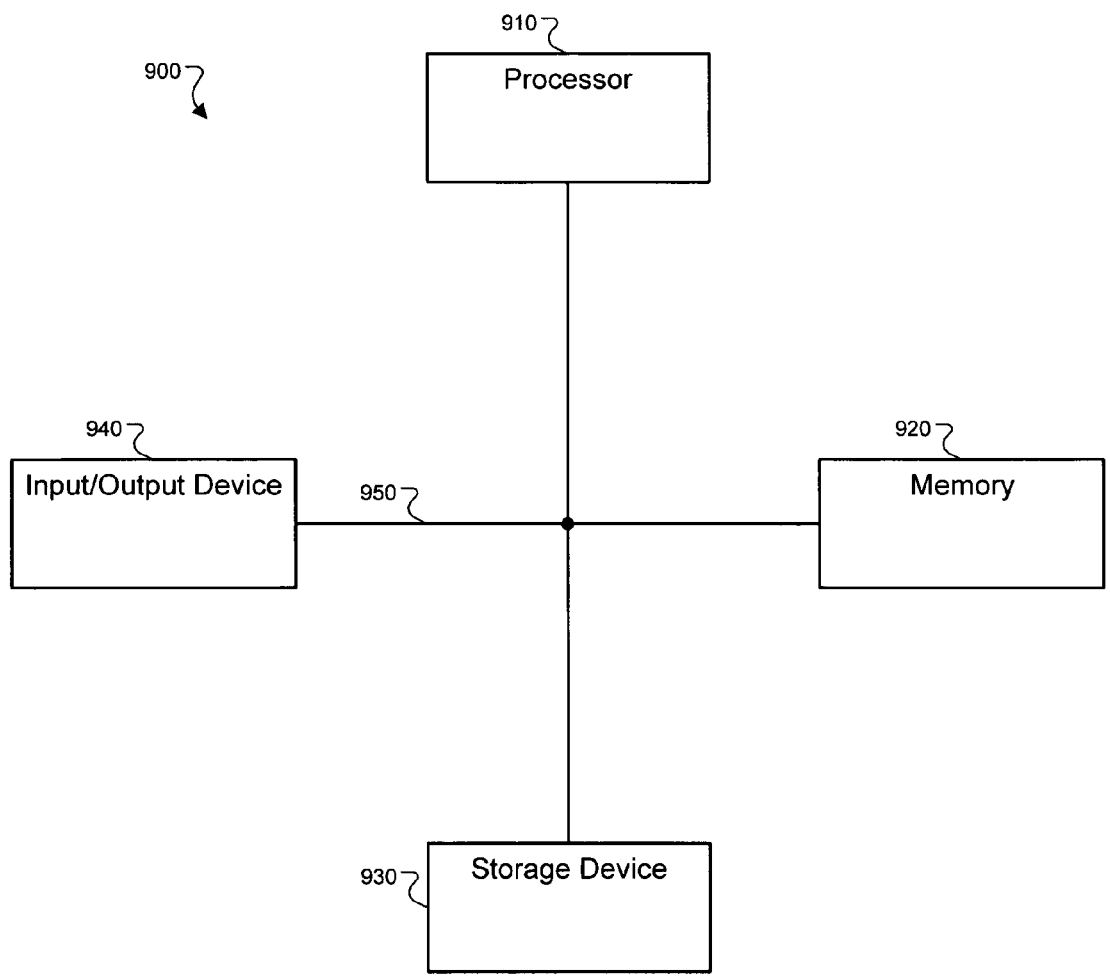
FIG. 9 is a block diagram of a computer system.

FIG. 9 is a block diagram of a computer system 900 that can be used in the operations described above, according to one embodiment. For example, the system 900 may be included in the computer environment 102.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one embodiment, the processor 910 is a single-threaded processor. In another embodiment, the processor 910 is a multi-threaded processor. The processor 910 is capable of processing instructions stored in the memory 920 or on the storage device 930 to display graphical information for a user interface on the input/output device 940.

The memory 920 stores information within the system 900. In one embodiment, the memory 920 is a computer-readable medium. In one embodiment, the memory 920 is a volatile memory unit. In another embodiment, the memory 920 is a non-volatile memory unit.

The storage device 930 is capable of providing mass storage for the system 900. In one embodiment, the storage device 930 is a computer-readable medium. In various different embodiments, the storage device 930 may be a floppy disk device, a hard disk device, an optical disk device, or a tape device.

The input/output device 940 provides input/output operations for the system 900. In one embodiment, the input/output device 940 includes a keyboard and/or pointing device. In one embodiment, the input/output device 940 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method to be performed in a database analysis tool, the method comprising:

displaying selected contents of a database table in a database analysis tool being executed in a computer system, the database analysis tool configured to facilitate analysis of any of multiple tables in the database by displaying contents in response to a user request that indicates at least one of the multiple tables;

receiving a user's selection of a portion of the selected contents, the portion containing information that identifies an object associated with an application program in the computer system; and automatically causing, in response to receiving the user's selection, the application program to perform a predefined action with regard to the object.

2. The method of claim 1, wherein the predefined action comprises a display method, and wherein the object is displayed in a user interface of the application program upon the display method being performed.

3. The method of claim 2, wherein the database analysis tool ceases to be displayed upon the object being displayed in the user interface of the application program, further comprising again displaying the database analysis tool upon receiving a user input to cease displaying the object, the selected contents of the database table again being displayed in the database analysis tool.

4. The method of claim 1, wherein the selected contents of the database table include a predefined number of rows of the database table specified by the user.

5. The method of claim 4, further comprising performing a reselect on the database table in response to receiving a user input made with a filter control in the database analysis tool, the reselect being automatically performed on all contents of the database table.

6. The method of claim 1, wherein there is displayed in the database analysis tool 1) a database table content area containing the selected contents, and 2) a database table structure area describing at least one attribute of the selected contents.

7. The method of claim 1, wherein the selected contents are displayed upon the user selecting the database table among several database tables in a work area in the database analysis tool.

8. The method of claim 7, further comprising 1) receiving a user input made under guidance of the work area while the selected contents are being displayed, the user input identifying another one of the several database tables that has a predefined association with the database table, and 2) displaying in the database analysis tool, in response to the user input, selected contents of the other database table that match the database table whose contents were first displayed in the database analysis tool.

9. The method of claim 8, wherein the predefined association is automatically created using a foreign key relation between the database table and the other database table.

10. The method of claim 8, wherein the predefined association is automatically created upon a user-initiated drag-and-drop operation that associates at least one row of the database table with the other database table.

11. The method of claim 8, wherein the predefined association is automatically created upon receiving a user-specified edit of a mapping relating to the database table.

12. The method of claim 7, wherein predefined associations exist between the database table and at least some others of the several database tables, further comprising displaying the predefined associations in an associations area of the database analysis tool.

13. The method of claim 12, wherein the user initiates a multi-level select between at least two of the several database tables under guidance of the associations area.

14. A computer program product tangibly embodied in an information carrier, the computer program product including instructions that, when executed, cause a processor to perform operations comprising:

displaying selected contents of a database table in a database analysis tool being executed in a computer system, the database analysis tool configured to facilitate analysis of any of multiple tables in the database by displaying contents in response to a user request that indicates at least one of the multiple tables;

receiving a user's selection of a portion of the selected contents, the portion containing information that identifies an object associated with an application program in the computer system; and automatically causing, in response to receiving the user's selection, the application program to perform a predefined action with regard to the object.

15. A computer system comprising:

a repository having stored therein multiple database tables;

an application program configured to perform a predefined action with regard to an object; and a database analysis tool configured to facilitate analysis of any of the multiple database tables by displaying selected contents in response to a user request that indicates at least one of the multiple database tables, wherein in response to a user selecting, in the database analysis tool, a portion of the selected contents containing information that identifies the object, the database analysis tool causes the application program to perform the predefined action with regard to the object.

16. The computer system of claim 15, further comprising at least one other database analysis tool, and wherein the database analysis tool provides that the user can initiate the other database analysis tool with the database table, and thereafter return to the database tool with the selected contents of the database table being displayed.

17. The computer system of claim 15, wherein the database analysis tool is configured to generate 1) a database table content area containing the selected contents, and 2) a database table structure area describing at least one attribute of the selected contents.

18. The computer system of claim 15, wherein the database analysis tool is configured to generate a work area for displaying any of several database tables stored in the repository.

19. The computer system of claim 18, wherein predefined associations exist between the database table and at least some others of the several database tables, wherein the database analysis tool is configured to generate an associations area displaying the predefined associations.

20. The computer system of claim 19, wherein the database analysis tool is configured to perform a multi-level select between at least two of the several database tables upon the user making an input under guidance of the associations area.

* * * * *